(12) United States Patent
Leigh et al.

(10) Patent No.: US 10,302,873 B1
(45) Date of Patent: May 28, 2019

(54) OPTICAL WAVE BRIDGE ADAPTER

(71) Applicant: HEWLETT PACKARD ENTERPRISE DEVELOPMENT LP, Houston, TX (US)

(72) Inventors: Kevin Leigh, Houston, TX (US); John Norton, Houston, TX (US); Sagi Mathai, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/966,052

(22) Filed: Apr. 30, 2018

(51) Int. Cl.
G02B 6/38 (2006.01)

(52) U.S. Cl.
CPC ......... *G02B 6/3825* (2013.01); *G02B 6/3873* (2013.01)

(58) Field of Classification Search
None
See application file for complete search history.

(56) References Cited

U.S. PATENT DOCUMENTS

| | | | |
|---|---|---|---|
| 4,952,263 A | 8/1990 | Kakii et al. | |
| 5,241,612 A | 8/1993 | Iwama | |
| 6,012,852 A | 1/2000 | Kadar-Kallen et al. | |
| 6,542,671 B1 | 4/2003 | Ma et al. | |
| 6,845,184 B1 | 1/2005 | Yoshimura et al. | |
| 9,377,594 B2 | 6/2016 | Liff et al. | |
| 2011/0249319 A1* | 10/2011 | Savage-Leuchs | G02B 6/02347 359/341.1 |

FOREIGN PATENT DOCUMENTS

| | | | | |
|---|---|---|---|---|
| JP | 2001-33655 | * | 2/2001 | ............. G02B 6/42 |
| JP | 2005309259 | | 11/2005 | |

OTHER PUBLICATIONS

Machine translation for JP 2001-33655.*
Dr. Markus Michler "Connecting Integrated Optical Systems . . . Future Applications," in Workshop on "Connectors for Advanced Fiber Systems" . . . Diamond SA Jun. 26, 2014, 19 pages.

* cited by examiner

*Primary Examiner* — Jerry Rahll
(74) *Attorney, Agent, or Firm* — Nolte Intellectual Property Law Group

(57) ABSTRACT

A bridge adapter that includes a first end and a second end. The bridge adapter further including a first ferrule connection on the first end and a second ferrule connection on the second end. The bridge adapter also including an optical path optically connecting the first ferrule connection and the second ferrule connection. Also, a method of connection optical cable having multiple pitches, the method including connecting a first optical cable having a first fiber pitch to a bridge adapter and connection having a second fiber pitch to the bridge adapter. The method further including directing an optical signal through the first optical cable, the bridge adapter, and the second optical cable, wherein the directing includes sending the optical signal through an optical wave bridge in the bridge adapter and having the first fiber pitch on a first end and the second fiber pitch on the second end.

19 Claims, 16 Drawing Sheets

OPTICAL WAVE BRIDGE ADAPTER

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical communication, and for some applications, optical fibers may be coupled to other optical fibers and/or system components by an optical connector.

DETAILED DESCRIPTION

Figure 1:
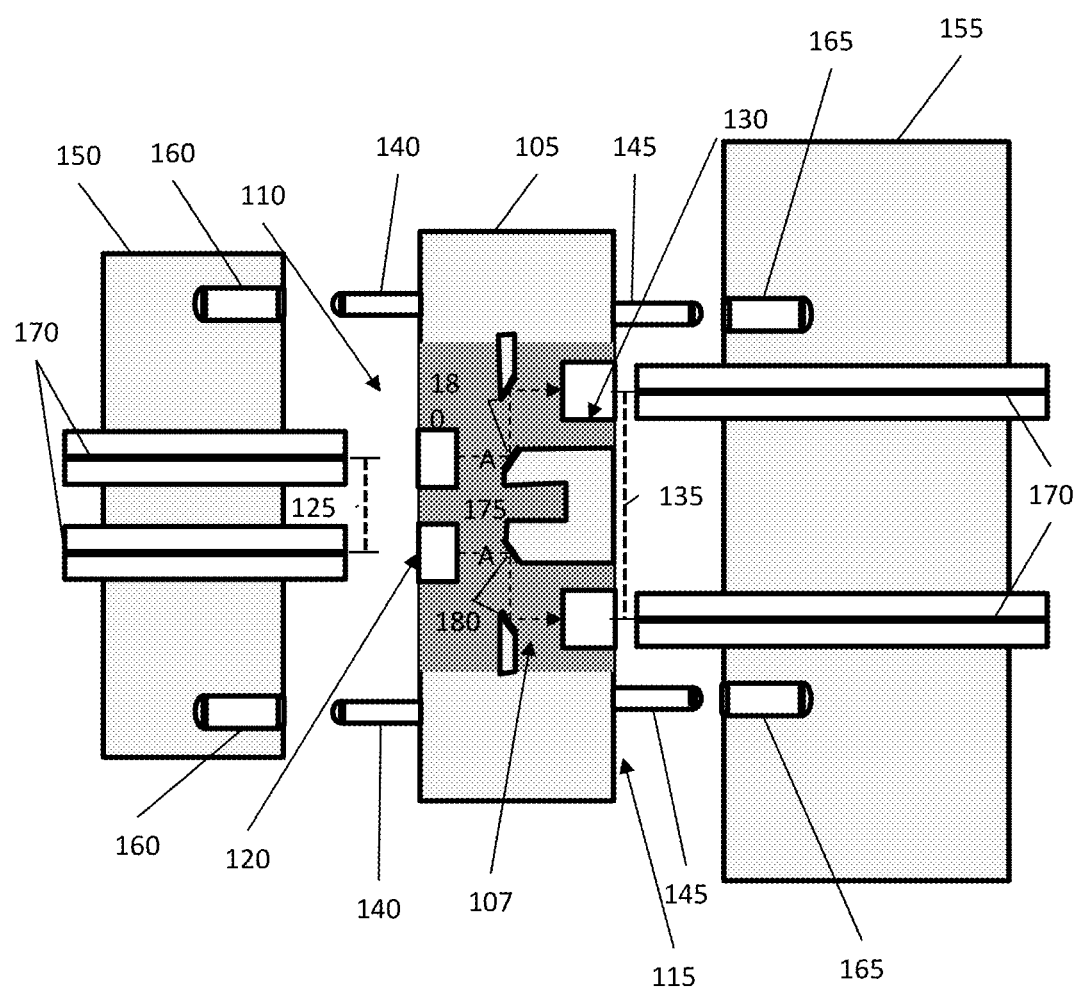
FIG. 1 shows a cross-sectional schematic view of an optical bridge incorporating total internal reflection before connection in accordance with one or more example embodiments.

One or more example, embodiments are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

Industry users of fiber optic cables often have to bridge the different fiber optic cables due to the cables having different types of connections. The different connection types may have different ferrule orientation, fiber pitch, alignment, and the like. As such, there are numerous types of fiber optic connections that are often used in the same systems that must be coupled. Traditionally, cables having different fiber pitches require their endpoints to be cut and re-terminated to bridge the difference and allow optical communication therethrough. However, using such ferrule re-terminated connections create expensive, cumbersome, and communication issues that result in optical power signal loss, as well as introduce weak points within the system.

Example embodiments may provide an adapter that allows fiber optic cables having different fiber pitches to be connected to a single adapter having an optical path established therethrough. Accordingly, example embodiments may allow for cables having different fiber pitches to be quickly and inexpensively connected and disconnected regardless of the fiber pitch.

Figure 2:
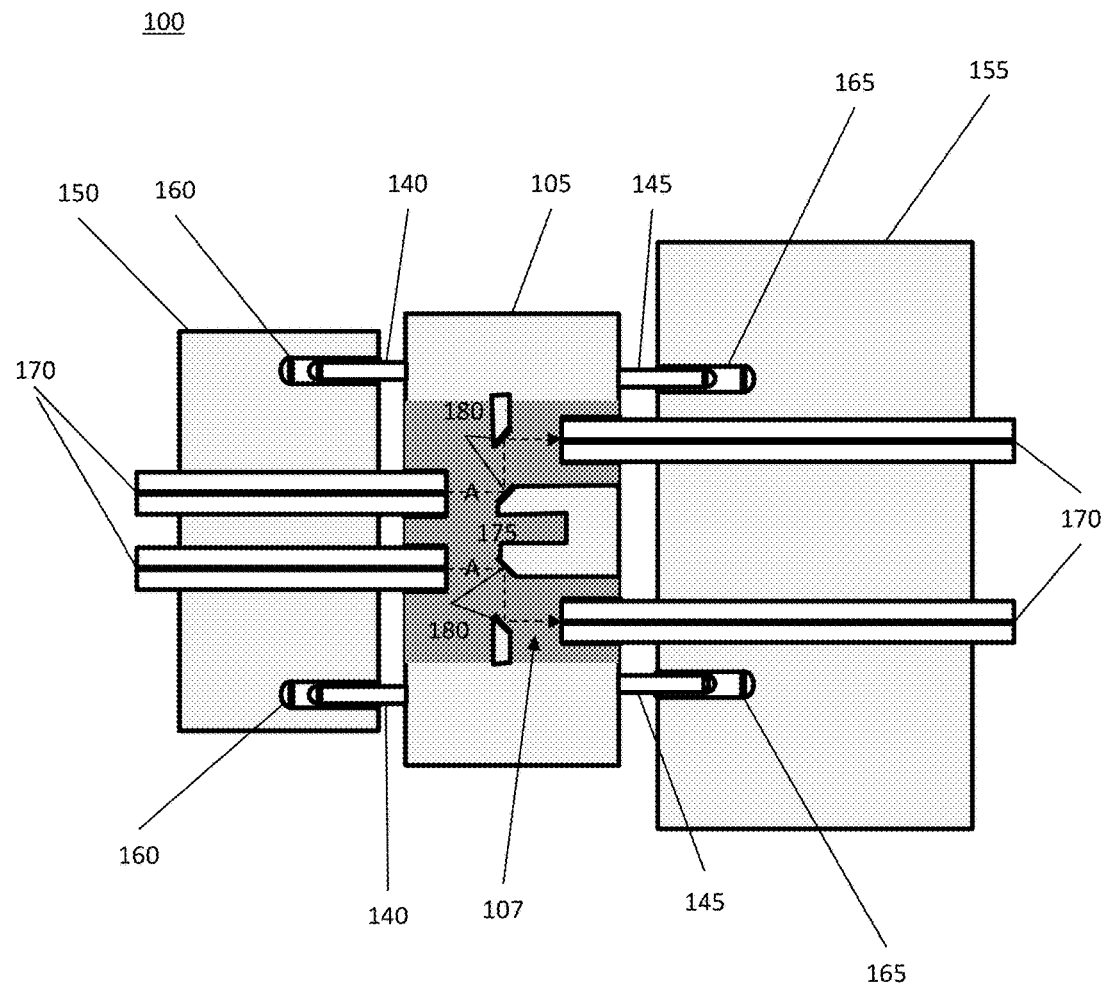
FIG. 2 shows a cross-sectional schematic view of an optical bridge incorporating total internal, reflection during connection in accordance with one or more example embodiments.
Figure 3:
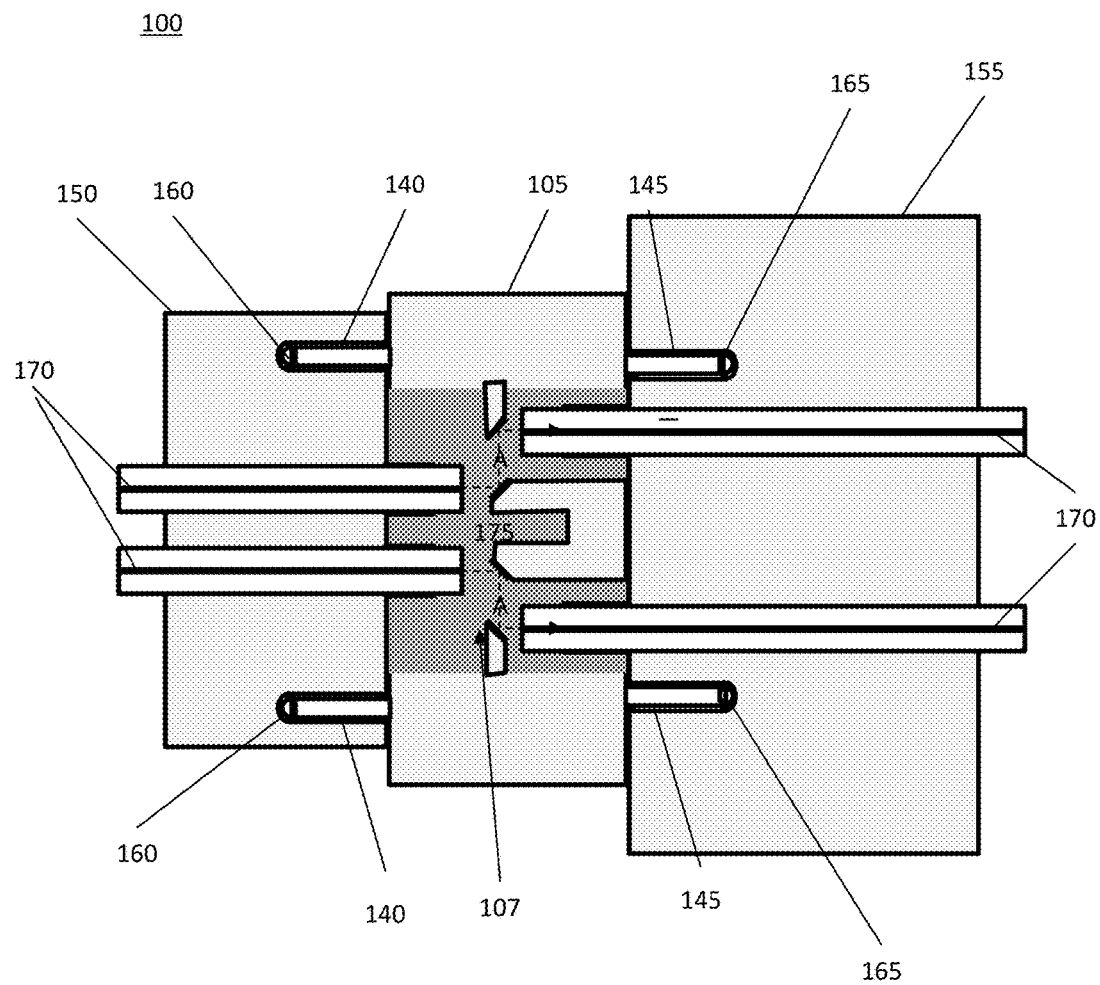
FIG. 3 shows a cross-sectional schematic view of an optical bridge incorporating total internal reflection after connection in accordance with one or more example embodiments.

Referring initially to FIGS. 1, 2, and 3, cross-sectional schematic views of an optical bridge incorporating total internal reflection in accordance with one or more example embodiments is shown. In this embodiment, a bridge adapter 100 is shown having an adapter housing 105, the adapter housing 105 having a first end 110 and a second end 115. An optical wave bridge 107 is disposed between the first end 110 and the second end 115 within the adapter housing 105. On the first end 110 a first ferrule connection 120 is disposed, the first ferrule connection 120 having a first fiber pitch 125. On the second end 115 a second ferrule connection 130 is disposed, the second ferrule connection 130 having a second fiber pitch 135. The first and second ferrule connections 120, 130 are configured to receive optical connectors having differing pitches, which will be discussed in detail below.

The adapter housing 105 further includes a first ferrule alignment feature 140 disposed on the first end 110 and a second ferrule alignment feature 145 disposed on the second end 115. The ferrule alignment features 140, 145 are configured to align optical connectors to the first and second ferrule connections 120, 130 during connection makeup.

FIGS. 1, 2, and 3 further illustrate a first optical connector 150 having the first fiber pitch 125 and a second optical connector 155 having the second fiber pitch 135. The first and second optical connectors 150, 155 may also include first and second connector alignment features 160, 165. The first and second connector alignment features 160, 165 may be configured to engage the first and second ferrule alignment features 140, 145 of the bridge adapter 100, respectively. The first and second optical connectors 150, 155 include one or more optical fibers 170. The optical fibers 170 act as a transmission channel for carrying an optical signal loaded with information.

The optical wave bridge 107 further includes an optical path 175 over which an optical signal received from the first optical connector 150 may be transmitted through the bridge adapter 100 and to the second optical connector 155. The optical path 175 over which the optical signal travels may vary according to implementation-specific details of the bridge adapter 100. In this embodiment, the optical path 175 uses the phenomenon of total internal reflection (or, "TIR"), thereby allowing the optical signal to transmit through the bridge adapter 100 without losing significant signal strength.

The optical path 175 within optical wave bridge 107 may use various reflective surfaces 180 to reflect the optical signal from first optical connector 150 through the optical wave bridge 107 to the second optical connector 155. The optical wave bridge 107 may be constructed with ultem resins, glass, or various other materials that allow optical light to propagate within. Reflective surfaces 180 may include an air interface and various coatings including, but not limited to, gold and silver, multilayer dielectric mirrors, or various other reflective surfaces known to those of ordinary skill in the art having the benefit of this disclosure. The reflective surfaces 180 may be coatings applied to the internal surfaces of the optical wave bridge 107 or may be separate structure that is installed within or otherwise formed from separate material and installed within the optical wave bridge 107.

In one embodiment, the reflective surfaces 180 may be co-molded with the optical wave bridge 107, such that the reflective surfaces 180 are an integral part of the optical wave bridge 107. In such an embodiment, the reflective surfaces 180 may be formed having specified angles, thereby allowing the optical signal to be reflected at the specified angle. The angled surfaces may thereby allow the required reflection, while coatings on the back side of the angled surface allows the angled surface to be reflective. As illustrated in this embodiment, the optical signal may be transmitted with two reflective surfaces 180 for each optical signal, each reflective surface bending each optical signal approximately 90°, so the optical signal is transmitted along path A. In other embodiments, the variation between the first and second fiber pitches 125, 135 may use more than two reflective surfaces 180. For example, in a different embodiment three, four, five, or more reflective surfaces 180 may be used for each optical signal in order to transmit the optical signal from the first optical connector 150 through the optical wave bridge 107 and to the second optical connector 155.

In still other embodiments in addition to transmitting the optical signal along the optical path 175 between first and second optical connectors 150, 155 having different fiber pitches, the first and second optical connectors 150, 155 may have ferrules aligned with different angular orientation. For example, in certain situations the ferrules may be out of alignment along an X-plane, a Y-plane, or a Z-plane. FIGS. 1, 2, and 3 illustrate a difference in alignment along the Y-plane, however, in other embodiments the difference in alignment could be vertical along the X-plane, or the difference in alignment could be combinations thereof. Accordingly, as used herein, the difference between fiber pitch may include differences, whether in the X-plane, Y-plane, or Z-plane.

In other embodiments, optical wave bridge 107 may further include one or more lenses. Examples of types of lenses may include, for example, expanding lenses, focusing lenses, collimating lenses, and other lenses used in the transmission of optical signals known to those of skill in the art. For example, in one embodiment as the optical signal enters the optical wave bridge 107, the optical signal may pass through a collimating lens to collimate the optical signal along the optical path 175 and then pass through a focusing lens prior to exiting the optical wave bridge 107. Accordingly, through a series of reflective surfaces 180 and lenses, the optical signal may be collimated, magnified, focused, tilted, and otherwise transmitted along optical path 175 from a first optical connector 150, through the optical wave bridge 107 and into the second optical connector 155.

Referring specifically to FIG. 1, the bridge adapter 100, first optical connector 150, and second optical connector 155 are shown prior to connection. As discussed above, the first optical connector 150 and the second optical connector 155 have different fiber pitches 125, 135, thereby preventing the first optical connector 150 and the second optical connector 155 from being directly connected. As such, bridge adapter 100 may be used to connect the first and second optical connectors 150, 155 because bridge adapter 100 includes an optical wave bridge 107 allowing an optical signal to be transmitted therethrough. Progressing to FIG. 2, the bridge adapter 100 is shown with the first ferrule alignment feature 140 engaging the first connector alignment feature 160 and the second ferrule alignment feature 145 engaging the second connector alignment feature 165. At this point the connection is not complete and the optical signal may not be transmitted from the first optical connector 150 to the second optical connector 155. FIG. 3 shows the first and second optical connectors 150, 155 connected to the bridge adapter 100, thereby allowing an optical signal to be transmitted from the first optical connector 150 having the first fiber pitch 125 to the second optical connector 155 having the second fiber pitch 135.

Figure 4:
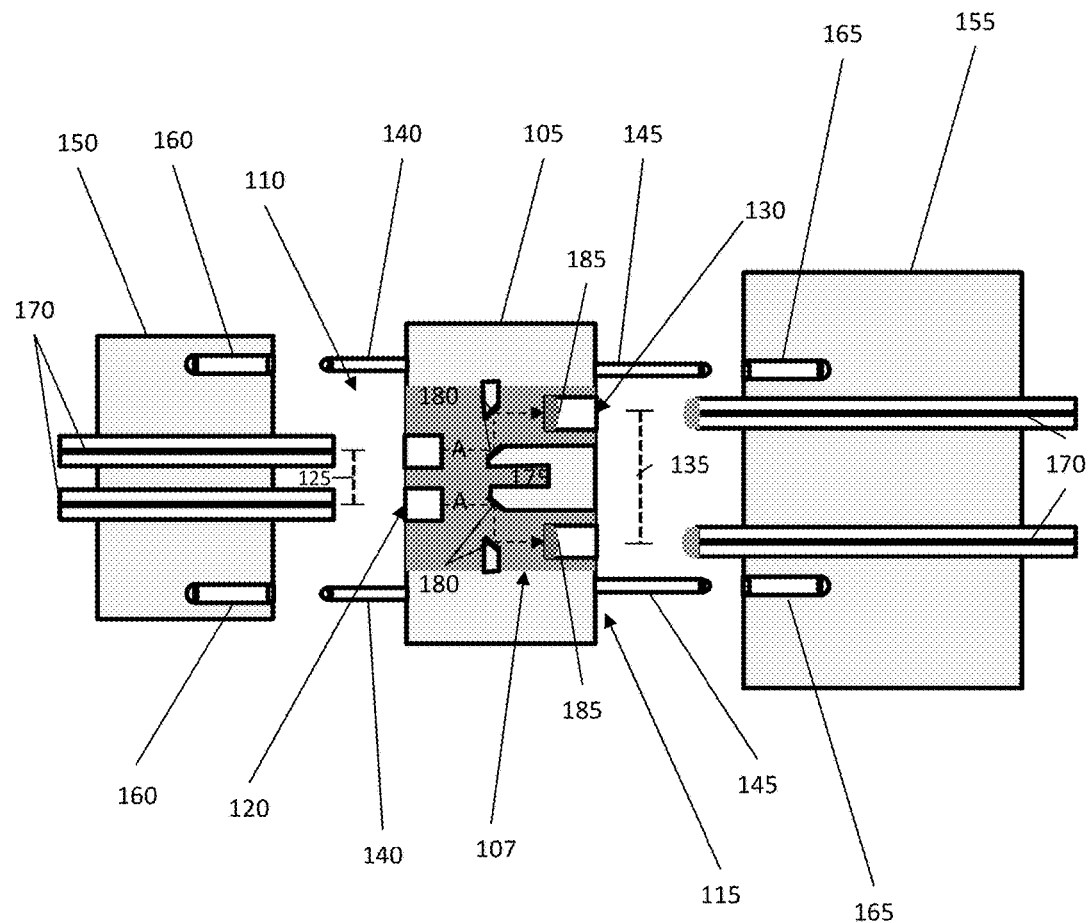
FIG. 4 shows a cross-sectional schematic view of an optical bridge incorporating total internal reflection with expanded beam lenses before connection in accordance with one or more example embodiments.
Figure 5:
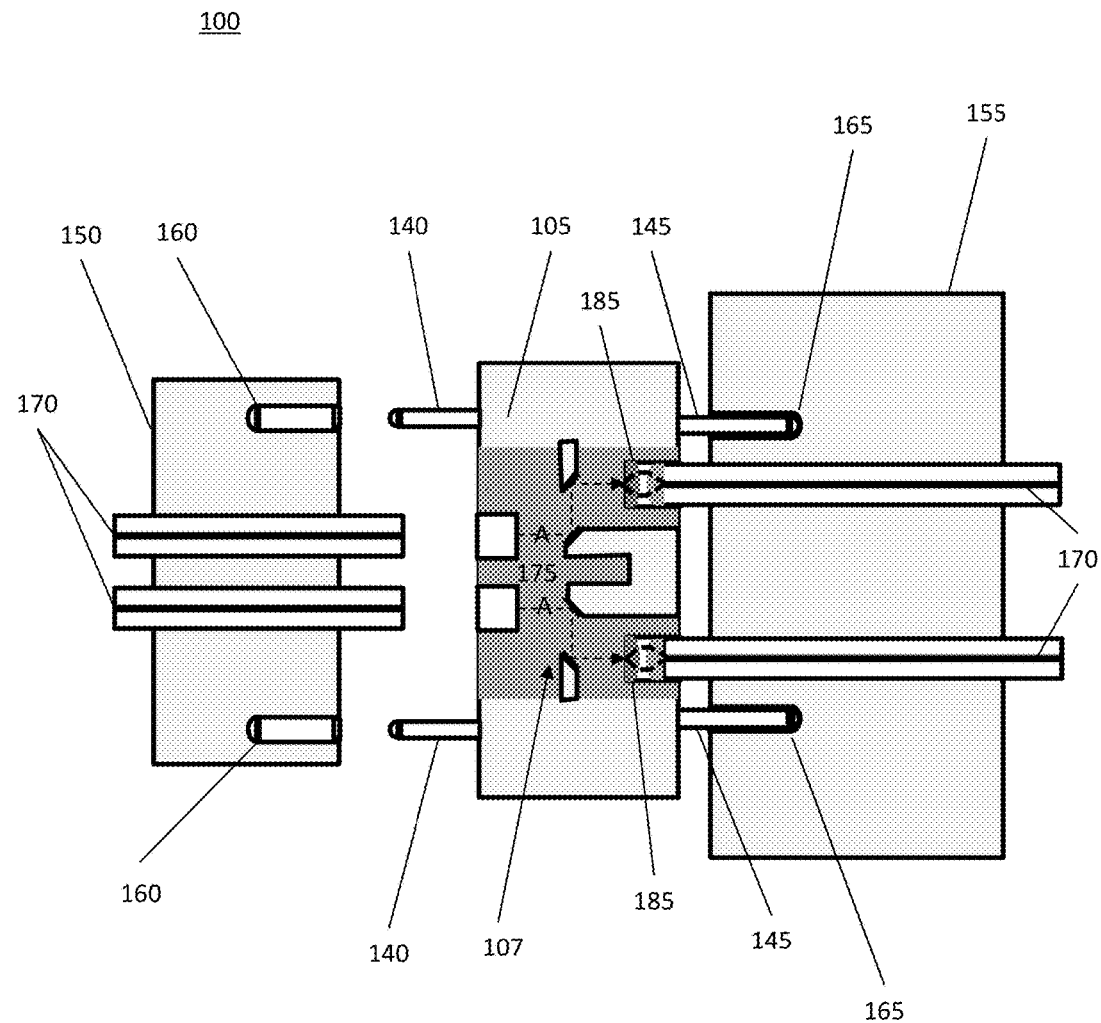
FIG. 5 shows a cross-sectional schematic view of an optical bridge incorporating total internal reflection with expanded beam lenses during connection in accordance with one or more example embodiments.

Referring to FIGS. 4 and 5, cross-sectional schematic views of an optical bridge incorporating total internal reflection and expanded beam lenses in accordance with one or more example embodiments is shown. In this embodiment, a bridge adapter 100 is shown having an adapter housing 105, the adapter housing 105 having a first end 110 and a second end 115. An optical wave bridge 107 is disposed between the first end 110 and the second end 115 within the adapter housing 105. On the first end 110 a first ferrule connection 120 is disposed, the first ferrule connection 120 having a first fiber pitch 125. On the second end 115 a second ferrule connection 130 is disposed, the second ferrule connection 130 having a second fiber pitch 135. The first and second ferrule connections 120, 130 are configured to receive optical connectors having differing pitches.

The adapter housing 105 further includes a first ferrule alignment feature 140 disposed on the first end 110 and a second ferrule alignment feature 145 disposed on the second end 115. The ferrule alignment features 140, 145 are configured to align optical connectors to the first and second ferrule connections 120, 130 during connection makeup.

In this embodiment, the optical wave bridge 107 further includes expanded beam lenses 185 that expand and collimate the optical signal received from the fibers of the first optical connector 150 and direct the signal into the second optical connector 155 incorporating a focusing lens (not labelled in FIG. 4). Such connections allow the optical signal to be transmitted through the first and second connector 150, 155 and through the optical wave bridge 107. Additionally, such expanded beam lenses 185 allow the optical connector mating to have looser tolerances to preserve signal strength or otherwise improve connectivity and transmission.

FIGS. 4 and 5 further illustrate a first optical connector 150 having the first fiber pitch 125 and a second optical connector 155 having the second fiber pitch 135. The first and second optical connectors 150, 155 may also include first and second connector alignment features 160, 165. The first and second connector alignment features 160, 165 may be configured to engage the first and second ferrule alignment features 140, 145 of the bridge adapter 100. The first and second optical connectors 150, 155 include one or more optical fibers 170. The optical fibers 170 act as a transmission channel for carrying an optical signal loaded with information.

The optical wave bridge 107 further includes an optical path 175 that allows an optical signal received from the first optical connector 150 to be transmitted through the bridge adapter 100 and to the second optical connector 155. The path the optical signal travels through the optical path 175 may vary according to the particular implementation of the bridge adapter 100. In this embodiment, the optical path 175 uses the phenomenon of total internal reflection, thereby allowing the optical signal to transmit through the bridge adapter 100 without losing significant signal strength. The optical signals may then be collimated, focused, and/or expanded through expanded beam lenses 185 prior to being transmitted to first and/or second optical connectors 150, 155.

The optical path 175 within optical wave bridge 107 may use various reflective surfaces 180 to reflect the optical signal from first optical connector 150 through the optical wave bridge 107 to the second optical connector 155. Variants of the reflective surfaces are discussed in detail with respect to FIGS. 1, 2, and 3.

In still other embodiments in addition to transmitting the optical signal along the optical path 175 between first and second optical connectors 150, 155 having different fiber pitches, the first and second optical connectors 150, 155 may have ferrules aligned with different angular orientation. Examples of alignment variations are discussed above with respect to FIGS. 1, 2, and 3.

In other embodiments, optical wave bridge 107 may further include one or more lenses, including or in addition to expanded beam lenses 185. Examples of types of lenses may include, for example, expanding lenses, focusing lenses, collimating lenses, tilting lenses and other lenses used in the transmission of optical signals known to those of skill in the art. For example, in one embodiment as the optical signal enters the optical wave bridge 107 the optical signal may pass through a collimating lens to direct the optical signal along the optical path 175, and then pass through a focusing lens prior to exiting the optical wave bridge 107. Accordingly, through a series of reflective surfaces 180 and lenses, the optical signal may be collimated, magnified, focused, tilted, and otherwise transmitted along optical path 175 from a first optical connector 150, through the optical wave bridge 107 and into the second optical connector 155.

Referring specifically to FIG. 4, the bridge adapter 100, first optical connector 150, and second optical connector 155 are shown prior to connection. As discussed above, the first optical connector 150 and the second optical connector 155 have different fiber pitches 125, 135, thereby preventing them from being directly connected. As such, bridge adapter 100 may be used to connect the first and second optical connectors 150, 155 because bridge adapter 100 includes an optical wave bridge 107 allowing an optical signal to be transmitted therethrough. FIG. 5 shows the first and second optical connectors 150, 155 connected to the bridge adapter 100, thereby allowing an optical signal to be transmitted from the first optical connector 150 having the first fiber pitch 125 to the second optical connector 155 having the second fiber pitch 135. In this embodiment, after the optical signal has been transmitted along Path A through a series of reflective surfaces, the optical signal passes through lenses 185, thereby collimating, focusing, and/or expanding the optical signal before it is passed out of optical wave bridge 107 and into the second optical connector 155.

Figure 6:
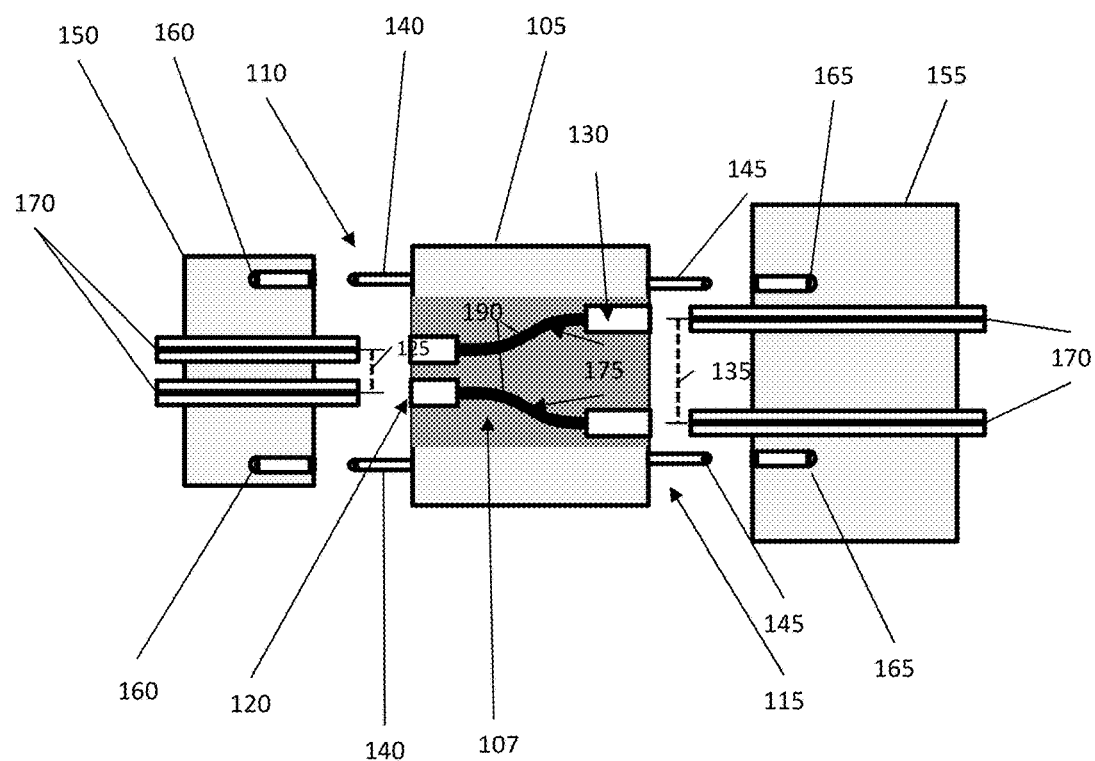
FIG. 6 shows a cross-sectional schematic view of an optical bridge incorporating embedded fibers before connection in accordance with one or more example embodiments.
Figure 7:
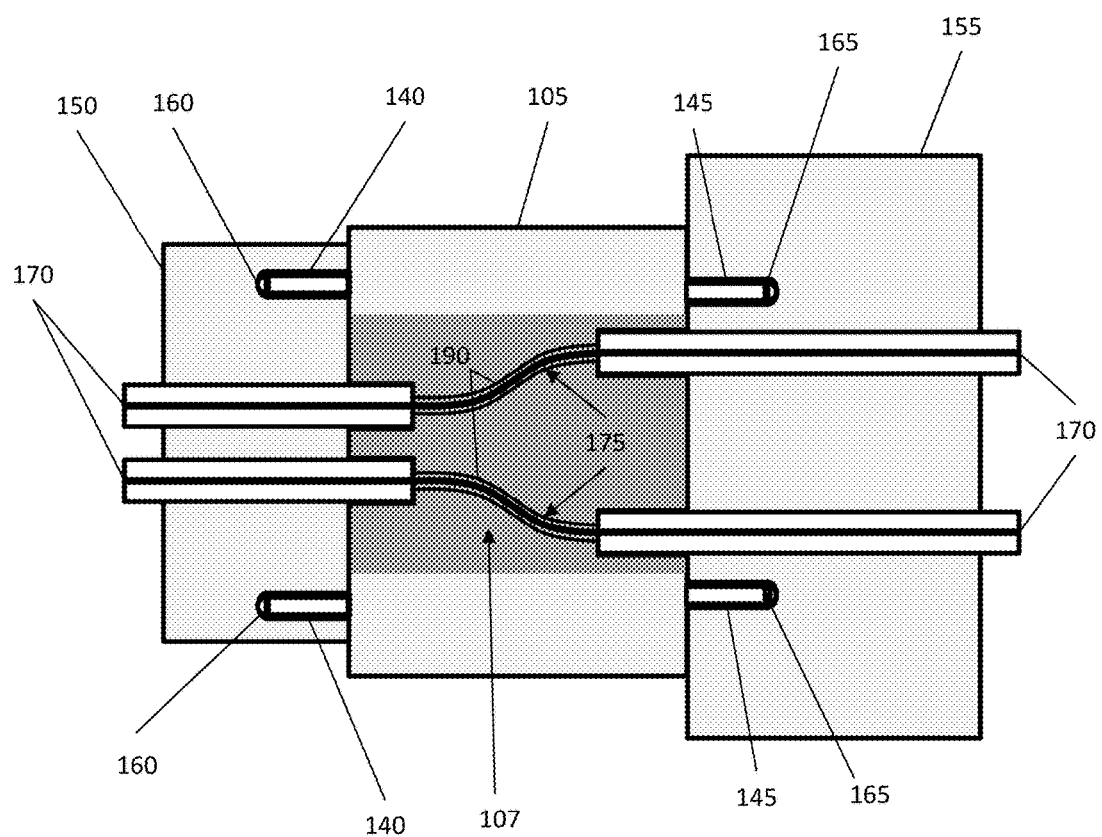
FIG. 7 shows a cross-sectional schematic view of an optical bridge incorporating embedded fibers after connection in accordance with one or more example embodiments.

Referring to FIGS. 6 and 7, cross-sectional schematic views of an optical bridge incorporating embedded fibers in accordance with one or more example embodiments is shown. In this embodiment, a bridge adapter 100 is shown having an adapter housing 105, the adapter housing 105 having a first end 110 and a second end 115. An optical wave bridge 107 is disposed between the first end 110 and the second end 115 within the adapter housing 105. On the first end 110 a first ferrule connection 120 is disposed, the first ferrule connection 120 having a first fiber pitch 125. On the second end 115 a second ferrule connection 130 is disposed, the second ferrule connection 130 having a second fiber pitch 135. The first and second ferrule connections 120, 130 are configured to receive optical connectors having differing pitches.

The adapter housing 105 further includes a first ferrule alignment feature 140 disposed on the first end 110 and a second ferrule alignment feature 145 disposed on the second end 115. The ferrule alignment features 140, 145 are configured to align optical connectors to the first and second ferrule connections 120, 130 during connection makeup.

FIGS. 6 and 7 further illustrate a first optical connector 150 having the first fiber pitch 125 and a second optical connector 155 having the second fiber pitch 135. The first and second optical connectors 150, 155 may also include first and second connector alignment features 160, 165. The first and second connector alignment features 160, 165 may be configured to engage the first and second ferrule alignment features 140, 145 of the bridge adapter 100. The first and second optical connectors 150, 155 include one or more optical fibers 170. The optical fibers 170 act as a transmission channel for carrying an optical signal loaded with information.

The optical wave bridge 107 further includes an optical path 175 that allows an optical signal received from the first optical connector 150 to be transmitted through the bridge adapter 100 and to the second optical connector 155. The path the optical signal travels through the optical path 175 may vary according to the particular implementation of the bridge adapter 100. In this embodiment, the optical path 175 uses embedded fibers 190, thereby allowing the optical signal to transmit through the bridge adapter 100 without losing significant signal strength.

In still other embodiments in addition to having to transmit the optical signal along the optical path 175 between first and second optical connectors 150, 155 having different fiber pitches, the first and second optical connectors 150, 155 may have ferrules aligned with different angular orientation. For example, in certain situations the ferrules may be out of alignment along an X-plane, a Y-plane, or a Z-plane. FIGS. 4, 5, and 6 illustrate a difference in alignment along the Y-plane, however, in other embodiments the difference in alignment could be vertical along the X-plane, or the difference in alignment could be combinations thereof. Accordingly, as used herein, the difference between fiber pitch may include difference, whether in the X-plane, Y-plane, or Z-plane.

In other embodiments, optical wave bridge 107 may further include one or more lenses. Examples of types of lenses may include, for example, expanding lenses, focusing lenses, collimating lenses, tilting lenses and other lenses used in the transmission of optical signals known to those of skill in the art. For example, in one embodiment as the optical signal enters the optical wave bridge 107 the optical signal may pass through a collimating lens to direct the optical signal along the optical path 175, and then pass through a focusing lens prior to exiting the optical wave bridge 107. Accordingly, using the embedded fiber in conjunction with various lenses, the optical signal may be collimated, magnified, focused, tilted, and otherwise transmitted along optical path 175 from a first optical connector 150, through the optical wave bridge 107 and into the second optical connector 155.

Referring specifically to FIG. 6, the bridge adapter 100, first optical connector 150, and second optical connector 155 are shown prior to connection. As discussed above, the first optical connector 150 and the second optical connector 155 have different fiber pitches 125, 135, thereby preventing them from being directly connected. As such, bridge adapter 100 may be used to connect the first and second optical connectors 150, 155 because bridge adapter 100 includes an optical wave bridge 107 allowing an optical signal to be transmitted therethrough. FIG. 7 shows the first and second optical connectors 150, 155 connected to the bridge adapter 100, thereby allowing an optical signal to be transmitted from the first optical connector 150 having the first fiber pitch 125 to the second optical connector 155 having the second fiber pitch 135. In this embodiment, rather than rely on a series of reflective surfaces (180 of FIG. 1), the optical signal travels through the embedded fibers 190 as it is transmitted through the optical wave bridge.

Figure 8:
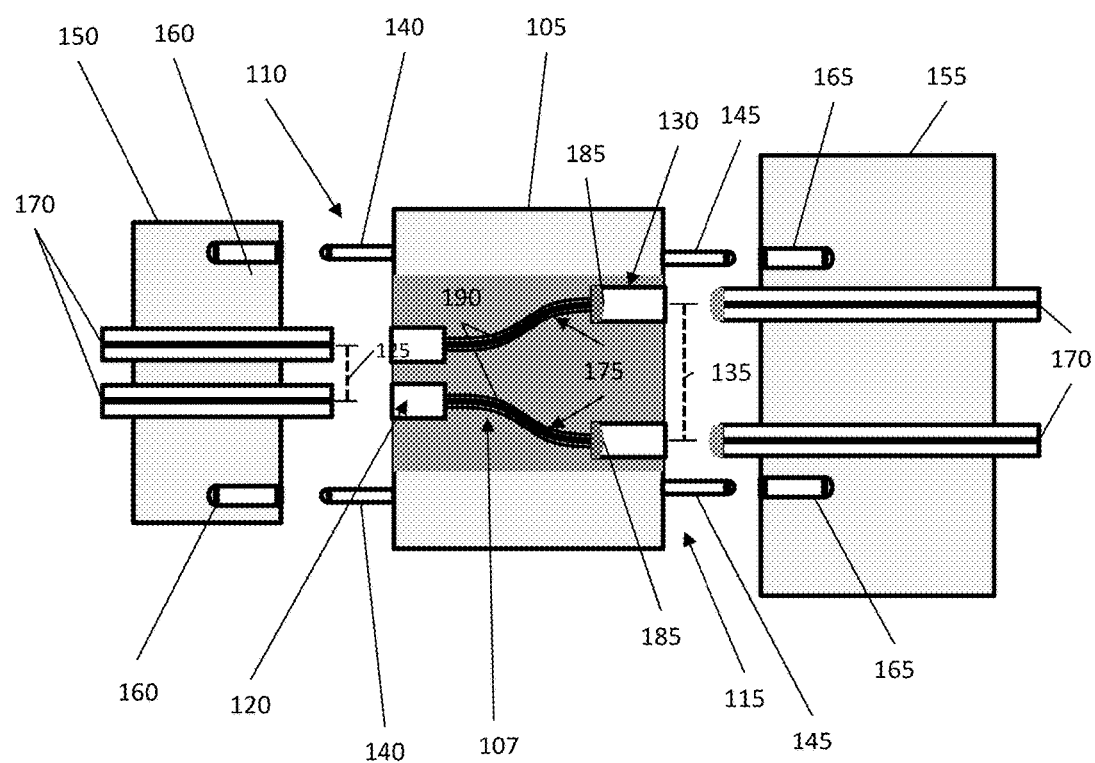
FIG. 8 shows a cross-sectional schematic view of an optical bridge incorporating embedded fibers and expanded beam lenses before connection in accordance with one or more example embodiments.
Figure 9:
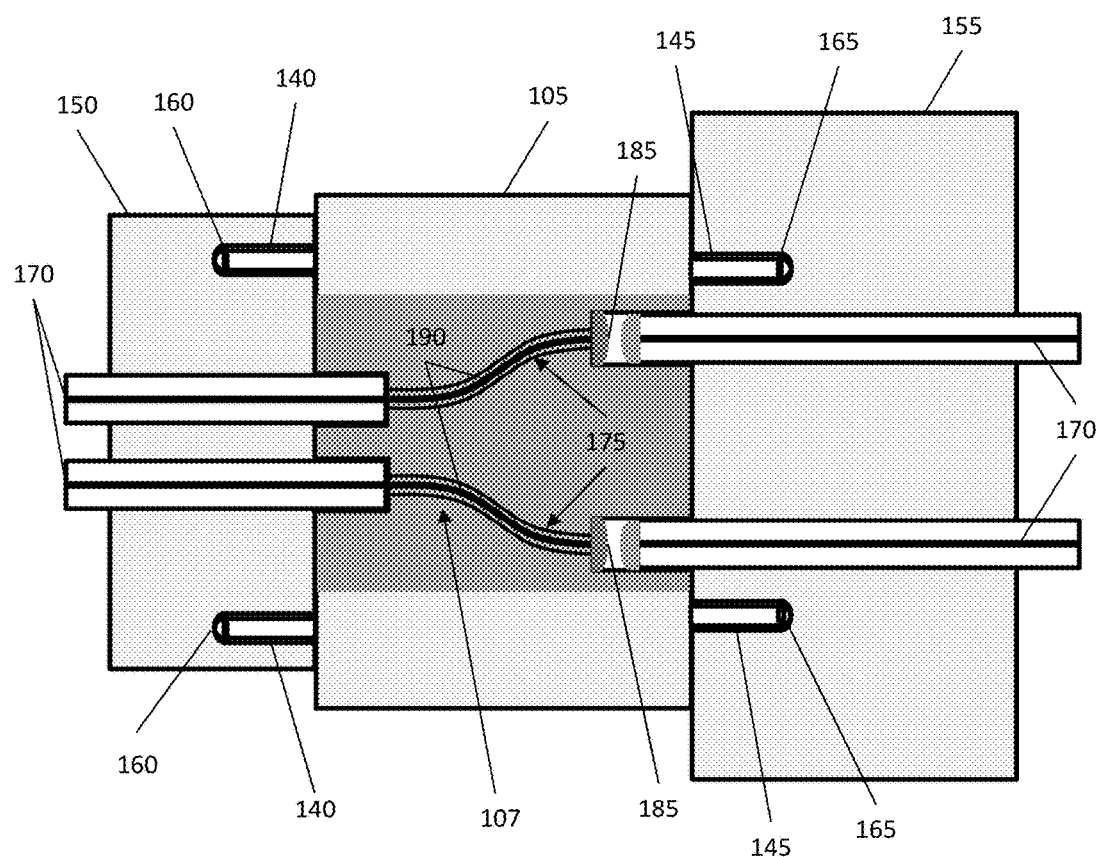
FIG. 9 shows a cross-sectional schematic view of an optical bridge incorporating embedded fibers and expanded beam lenses after connection in accordance with one or more example embodiments.

Referring to FIGS. 8 and 9, cross-sectional schematic views of an optical bridge incorporating embedded fibers and expanded beam lenses in accordance with one or more example embodiments is shown. In this embodiment, a bridge adapter 100 is shown having an adapter housing 105, the adapter housing 105 having a first end 110 and a second end 115. An optical wave bridge 107 is disposed between the first end 110 and the second end 115 within the adapter housing 105. On the first end 110 a first ferrule connection 120 is disposed, the first ferrule connection 120 having a first fiber pitch 125. On the second end 115 a second ferrule connection 130 is disposed, the second ferrule connection 130 having a second fiber pitch 135. The first and second ferrule connections 120, 130 are configured to receive optical connectors having differing fiber pitches, which will be discussed in detail below.

The adapter housing 105 further includes a first ferrule alignment feature 140 disposed on the first end 110 and a second ferrule alignment feature 145 disposed on the second end 115. The ferrule alignment features 140, 145 are configured to align optical connectors to the first and second ferrule connections 120, 130 during connection makeup.

In this embodiment, the optical wave bridge 107 further includes expanded beam lenses 185 that expand and collimate optical signals received from the fibers of the first optical connector 150 and direct the optical signal into the second optical connector 155 incorporating a focusing lens (not labelled in FIG. 8). Such connections allow the optical signal to be transmitted through the first and second connector 150, 155 and through the optical wave bridge 107. Additionally, such expanded beam lenses 185 allow the optical connector mating to have looser tolerances to preserve signal strength or otherwise improve connectivity and transmission.

FIGS. 8 and 9 further illustrate a first optical connector 150 having the first fiber pitch 125 and a second optical connector 155 having the second fiber pitch 135. The first and second optical connectors 150, 155 may also include first and second connector alignment features 160, 165. The first and second connector alignment features 160, 165 may be configured to engage the first and second ferrule alignment features 140, 145 of the bridge adapter 100. The first and second optical connectors 150, 155 include one or more optical fibers 170. The optical fibers 170 act as a transmission channel for carrying an optical signal loaded with information.

The optical wave bridge 107 further includes an optical path 175 that allows the optical signal received from the first optical connector 150 to be transmitted through the bridge adapter 100 and to the second optical connector 155. The path the optical signal travels through the optical path 175 may vary according to the particular implementation of the bridge adapter 100. In this embodiment, the optical path 175 uses embedded fibers 190, thereby allowing the optical signal to transmit through the bridge adapter 100 without losing significant signal strength.

In still other embodiments in addition to having to transmit the optical signal along the optical path 175 between first and second optical connectors 150, 155 having different fiber pitches, the first and second optical connectors 150, 155 may have ferrules aligned with different angular orientation.

In other embodiments, optical wave bridge 107 may further include one or more lenses, including or in addition to expanded beam lenses 185. Examples of types of lenses may include, for example, expanding lenses, focusing lenses, collimating lenses, tilting lenses and other lenses used in the transmission of optical signals known to those of skill in the art. For example, in one embodiment as the optical signal enters the optical wave bridge 107 the optical signal may pass through a lens to direct the optical signal along the optical path 175, then pass through a lens prior to exiting the optical wave bridge 107. Accordingly, the optical signal may be transmitted along optical path 175 from a first optical connector 150, through the optical wave bridge 107 and into the second optical connector 155.

Referring specifically to FIG. 8, the bridge adapter 100, first optical connector 150, and second optical connector 155 are shown prior to connection. As discussed above, the first optical connector 150 and the second optical connector 155 have different fiber pitches 125, 135, thereby preventing them from being directly connected. As such, bridge adapter 100 may be used to connect the first and second optical connectors 150, 155 because bridge adapter 100 includes an optical wave bridge 107 allowing an optical signal to be transmitted therethrough. FIG. 9 shows the first and second optical connectors 150, 155 connected to the bridge adapter 100, thereby allowing an optical signal to be transmitted from the first optical connector 150 having the first fiber pitch 125 to the second optical connector 155 having the second fiber pitch 135. In this embodiment, rather than rely on a series of reflective surfaces (180 of FIG. 1), the optical signal travels through the embedded fibers 190 as it is transmitted through the optical wave bridge 107.

Figure 10:
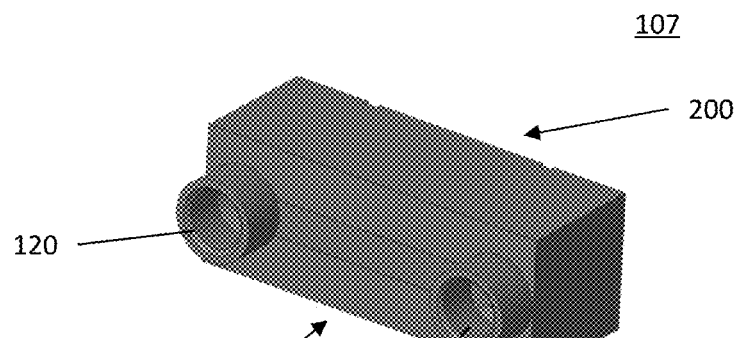
FIG. 10 shows an elevated perspective view of an optical wave bridge in accordance with one or more example embodiments.
Figure 11:
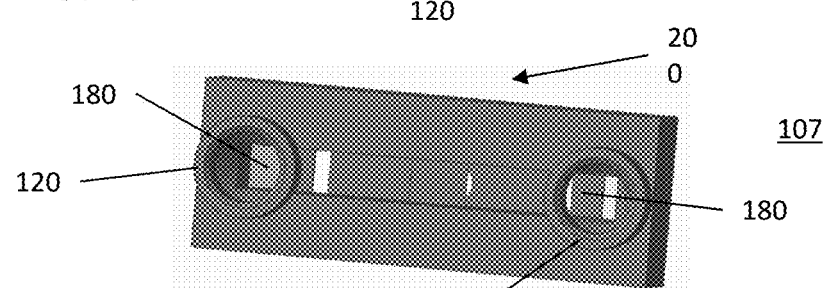
FIG. 11 shows a front perspective view of an optical wave bridge in accordance with one or more example embodiments.
Figure 12:
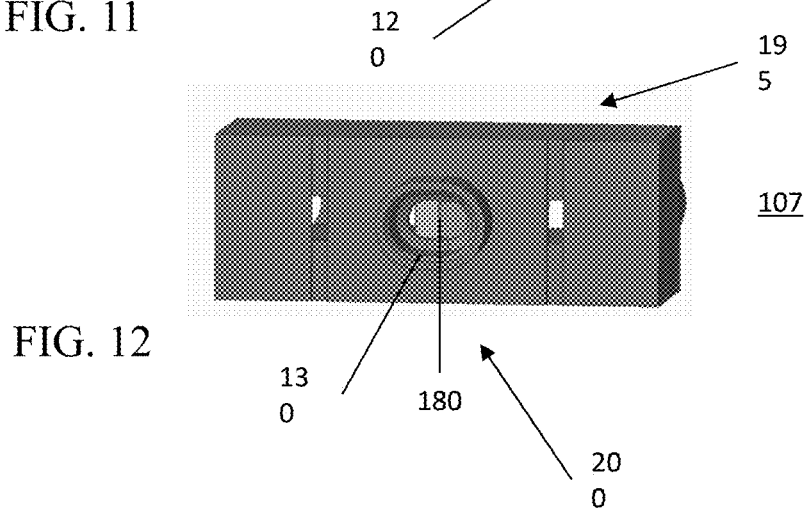
FIG. 12 shows a front perspective view of an optical wave bridge in accordance with one or more example embodiments.

Referring to FIGS. 10, 11, and 12, perspective views of an optical wave bridge in accordance with one or more example embodiments are shown. The optical wave bridge 107 in this embodiment illustrates an optical wave bridge 107 that may be used in an embodiment using total internal reflection. However, those of ordinary skill in the art having the benefit of this disclosure will appreciate that the external features of optical wave bridges 107 using embedded fibers are substantially the same, incorporating different internal components as discussed herein.

Optical wave bridge 107 has a first end 195 and a second end 200. The first end 195 has a first ferrule connection 120, while the second end 200 has a second ferrule connection 130. In certain embodiments, the first ferrule connection 120 has a first fiber pitch 125 and the second ferrule connection 130 has a second fiber pitch 135. As used herein, the difference between fiber pitch may include differences, whether in the X-plane, Y-plane, or Z-plane. For example, in certain situations the ferrules may be out of alignment along an X-plane, a Y-plane, or a Z-plane. FIG. 10 illustrates a difference in alignment along the Y-plane, however, in other embodiments the difference in alignment could be vertical along the X-plane, or the difference in alignment could be combinations thereof. Accordingly, as used herein, the difference between fiber pitch may include differences, whether in the X-plane, Y-plane, or Z-plane.

Referring specifically to FIG. 10, a front elevated perspective view of the optical wave bridge 107 is shown. Those of ordinary skill in the art having the benefit of this disclosure will appreciate that the fiber pitches may differ for different bridge adapters such that placement locations for first and second ferrule connections 120, 130 may vary. As the locations of first and second ferrule connections 120, 130 are located in different places, the internal configuration of the optical path may also differ. Thus, in certain embodiments, the first ferrule connection 120 may be lower on the optical wave bridge 107, while the second ferrule connection 130 may be higher on the optical wave bridge 107. In other embodiments the reverse may occur, while in still other embodiments the first and second ferrule connections 120, 130 may not be aligned in parallel. Thus, embodiments of the present disclosure include various configurations of first and second ferrule connection 120, 130 relative orientation such as inline, parallel, substantially parallel, non-parallel, and at various angles.

Referring specifically to FIG. 11, a first end perspective view of the optical wave bridge 107 is shown. In this illustration the internal reflective surfaces 180 may be seen. Similarly, with respect to FIG. 12, the second end perspective view of the optical wave bridge 107 illustrates the internal reflective surfaces 180 as seen through the second ferrule connection 130.

Figure 13:
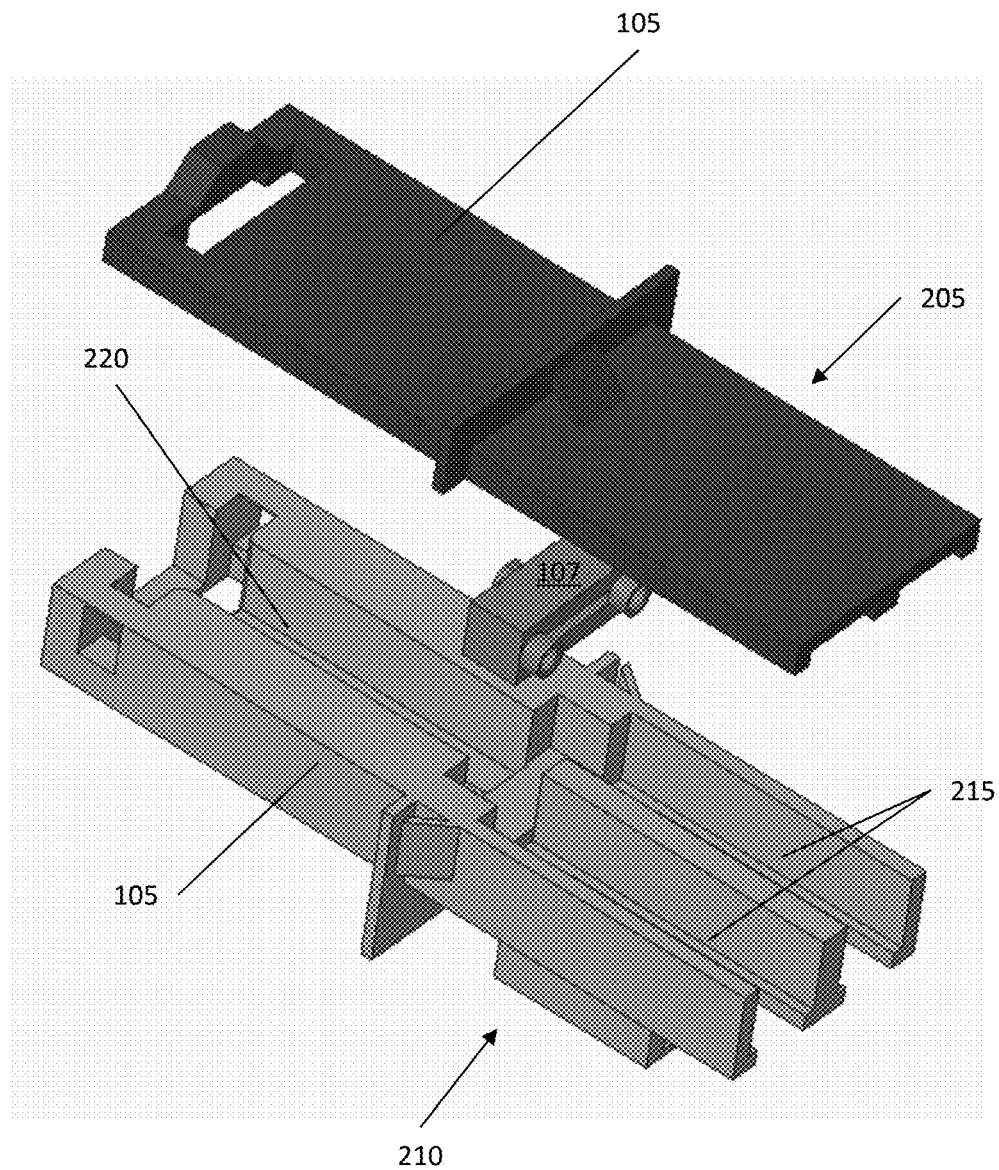
FIG. 13 shows a break away perspective view of an optical bridge in accordance with one or more example embodiments.

Referring to FIG. 13, an exploded perspective view of an optical wave bridge 107 in accordance with one or more example embodiments is shown. In this embodiment, an optical wave bridge 107 is shown in relative location between the adapter housing 105. The adapter housing 105 may have a top portion 205 and a basal portion 210. The top and basal portions 205, 210 may be formed separately and then connected through physical or chemical processes or may be of unibody construction with the adapter housing 105 formed around the optical wave bridge 107. In addition to the ferrule alignment features discussed above, adapter housing 105 may also include a first housing alignment feature 215 and a second housing alignment features 220. The first and second housing alignment features 215, 220 guide the first and second optical connectors (not shown) into the adapter housing, wherein the optical connection may be completed.

Figure 14:
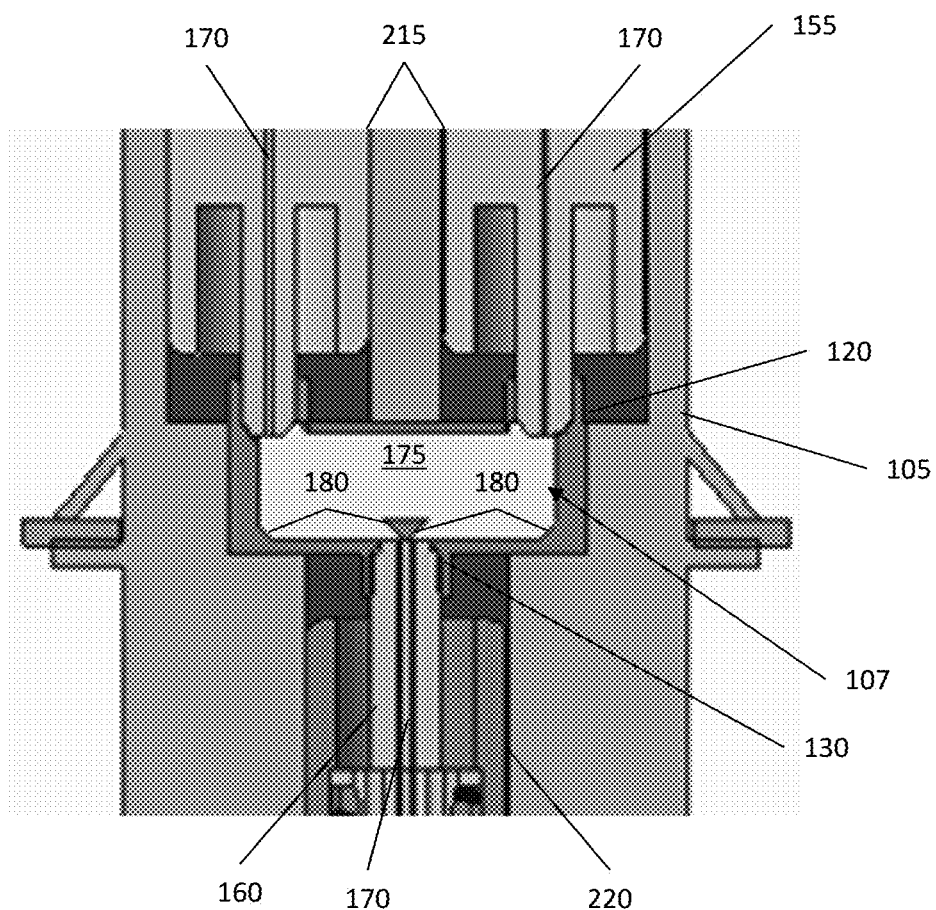
FIG. 14 shows a cross-sectional view of a connected optical bridge in accordance with one or more example embodiments.
Figure 15:
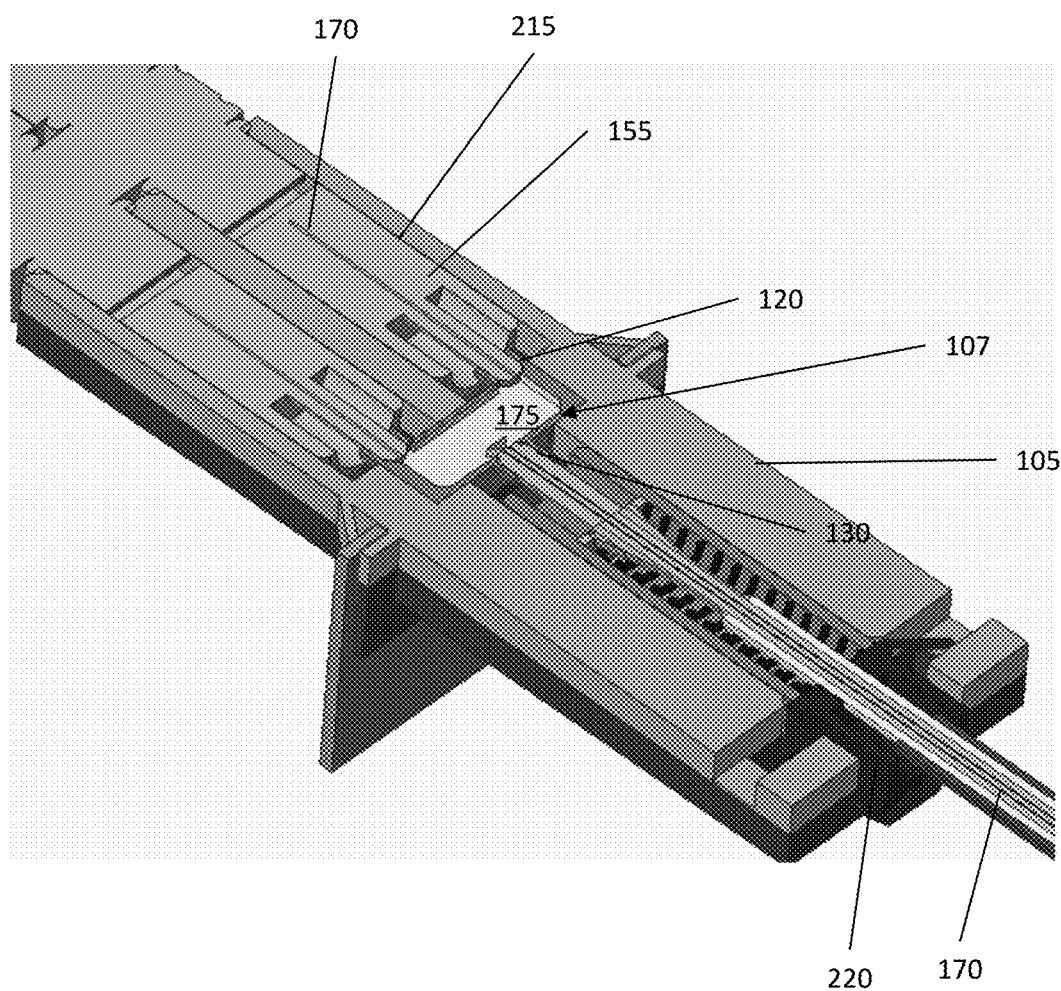
FIG. 15 shows a cross-sectional view of a connected optical bridge in accordance with one or more example embodiments.

Referring to FIGS. 14 and 15, cross-sectional views of a connected optical bridge 100 in accordance with one or more example embodiments is shown. In this embodiment, the bridge adapter 100 includes an adapter housing 105 having an optical wave bridge 107 disposed therein. The adapter housing 105 includes a first housing alignment feature 215 and a second housing alignment feature 220. The optical wave bridge 107 includes a first ferrule connection 120 and a second ferrule connection 130, wherein the first ferrule connection 120 and the second ferrule connection 130 have different pitches, as explained in detail above. The optical wave bridge 107 also includes an optical path 175, which in this embodiment uses total internal reflection and uses a plurality of reflective surfaces 180 to transmit an optical signal therethrough. FIGS. 14 and 15 further illustrate a first optical connector 155 and a second optical connector 160, each with a pair of optical fibers 170 passing therethrough, connected to the bridge adapter 100.

Figure 16:
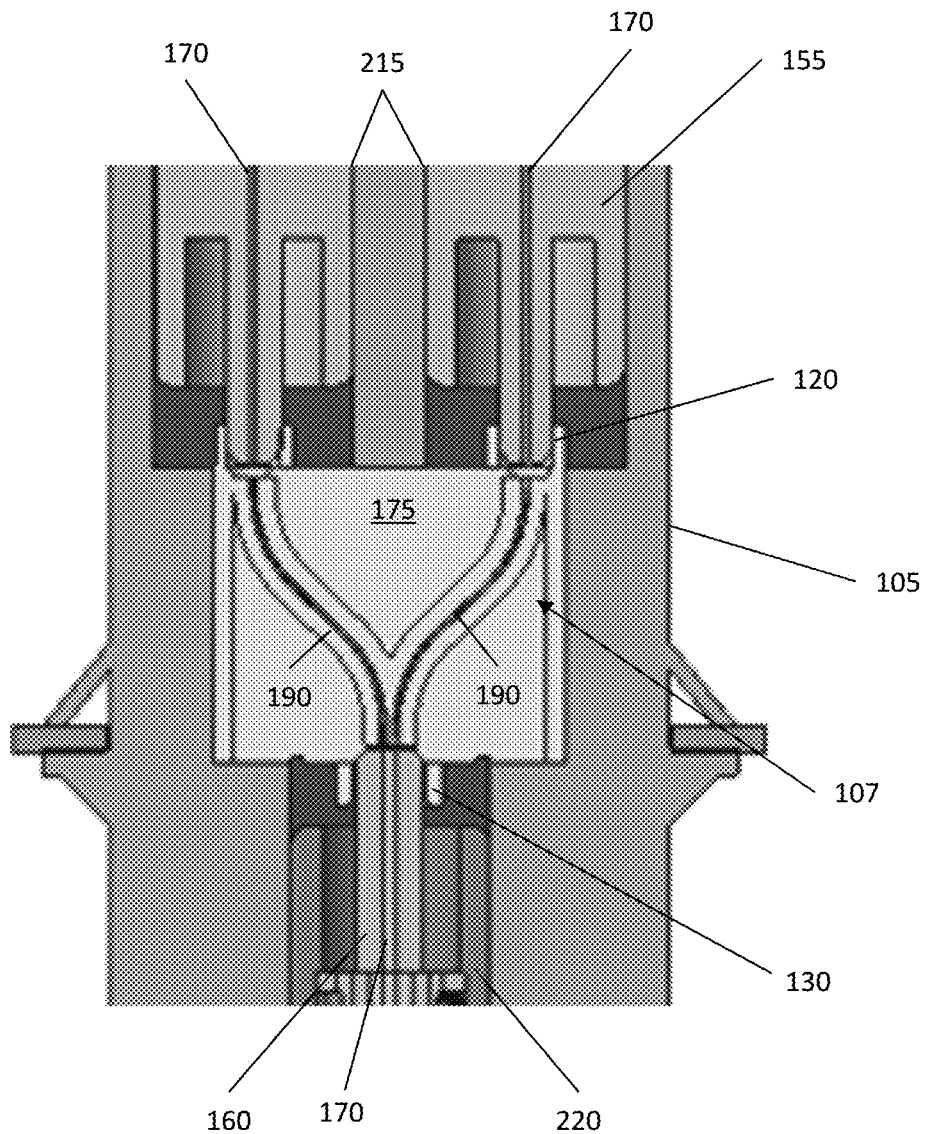
FIG. 16 shows a cross-sectional view of a connected optical bridge in accordance with one or more example embodiments.
Figure 17:
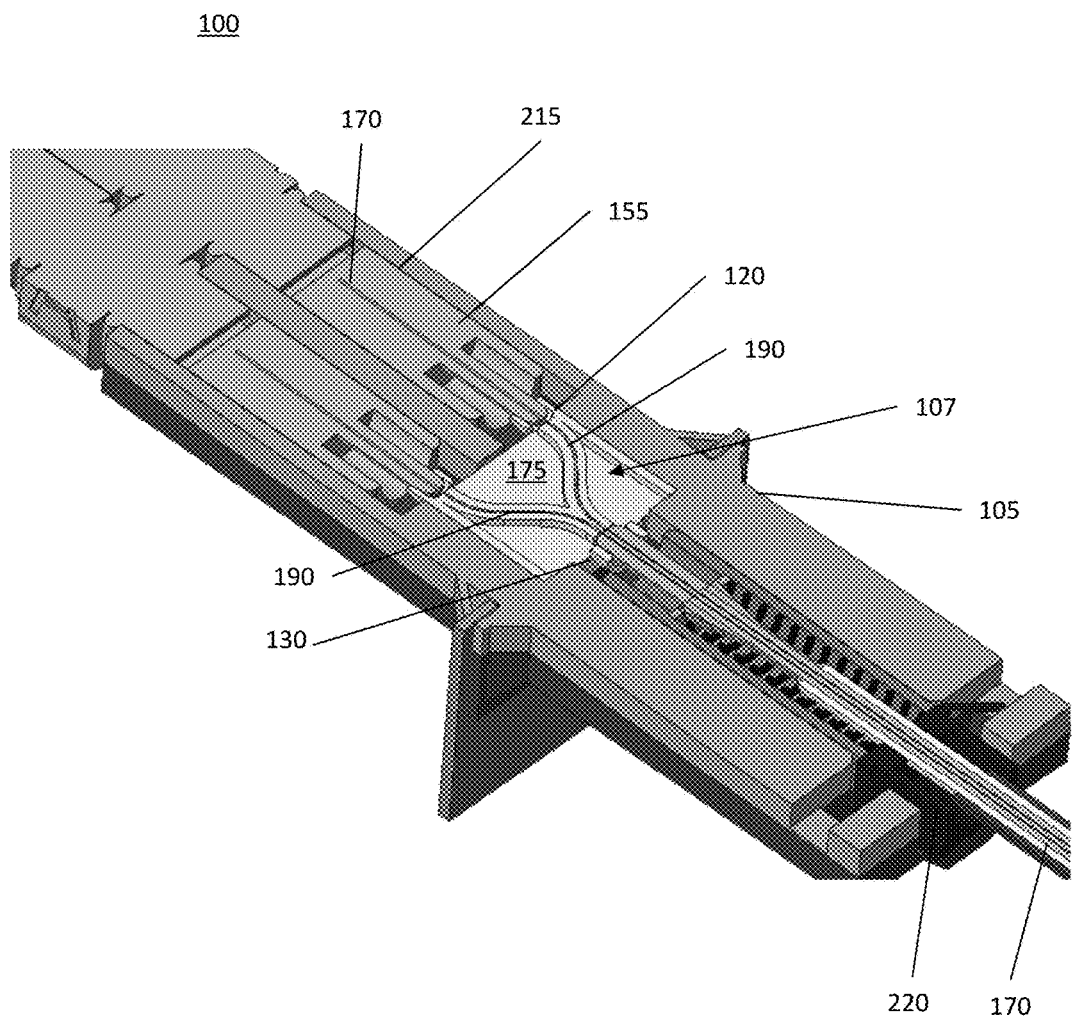
FIG. 17 shows a cross-sectional view of a connected optical bridge in accordance with one or more example embodiments.

Referring to FIGS. 16 and 17, cross-sectional views of a connected optical wave bridge 100 in accordance with one or more example embodiments is shown. In this embodiment, the bridge adapter 100 includes an adapter housing 105 having an optical wave bridge 107 disposed therein. The adapter housing 105 includes a first housing alignment feature 215 and a second housing alignment feature 220. The optical wave bridge 107 includes a first ferrule connection 120 and a second ferrule connection 130, wherein the first ferrule connection 120 and the second ferrule connection 130 have different pitches, as explained in detail above. The optical wave bridge 107 also includes an optical path 175, which in this embodiment uses embedded fibers 190 to transmit an optical signal therethrough. FIGS. 16 and 17 further illustrate a first optical connector 155 and a second optical connector 160, each with a pair of optical fibers 170 passing therethrough, connected to the bridge adapter 100.

Figure 18:
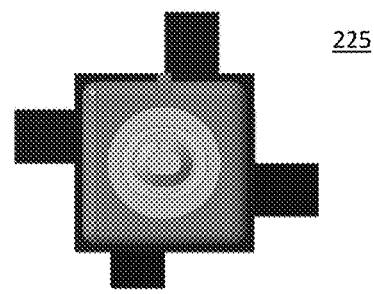
FIG. 18 shows a front view of an optical cable in accordance with one or more example embodiments.
Figure 19:
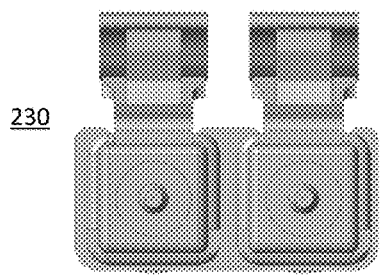
FIG. 19 shows a front view of an optical cable in accordance with one or more example embodiments.

Referring to FIGS. 18, 19, 20, 21, and 22 views of optical connectors and an optical wave bridge in accordance with one or more example embodiments is shown. FIG. 18 shows an end view of a first optical cable 225 having a first fiber pitch, while FIG. 19 shows an end view of a second optical cable 230 having a second fiber pitch.

Figure 20:
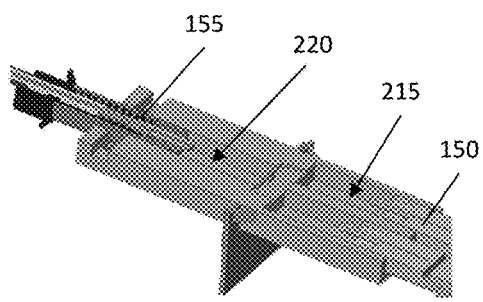
FIG. 20 shows a cross-sectional top perspective view of a connected optical bridge in accordance with one or more example embodiments.

Turning to FIG. 20, the bridge adapter 100 is shown receiving first and second optical connectors 150, 155. The first and second optical connectors 150, 155 each have different fiber pitches and are illustrated passing through their respective first housing and second housing alignment features 215, 220.

Figure 21:
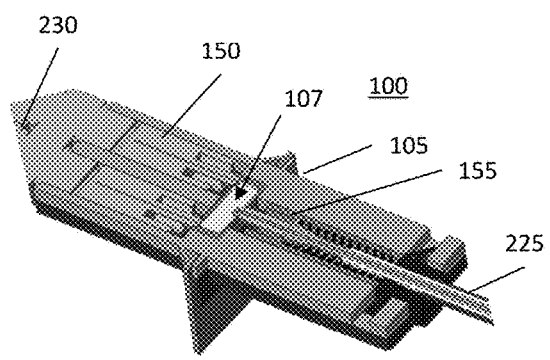
FIG. 21 shows a cross-sectional top perspective view of a connected optical bridge in accordance with one or more example embodiments.

FIG. 21 shows a cross-sectional view of the first and second optical cables 225, 230 having respective first and second optical connectors 150, 155 in optical communication with the optical wave bridge 107 disposed within the adapter housing 105. After the optical cables 225, 230 and bridge adapter 100 are in optical communication, an optical signal may be transmitted therethrough.

Figure 22:
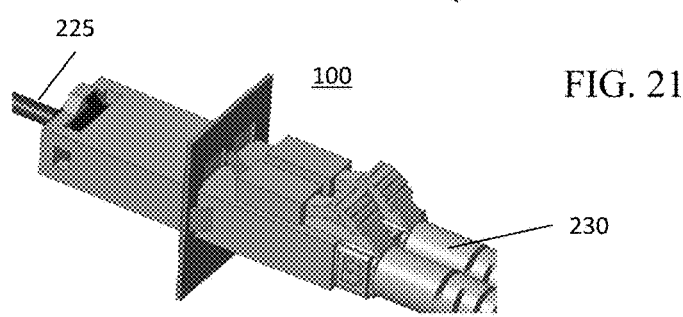
FIG. 22 shows a perspective view of a connected optical bridge in accordance with one or more example embodiments.

FIG. 22 shows an external perspective view of the first and second optical cables 225, 230 connected to the bridge adapter 100, thereby allowing optical communication between two optical cables having different fiber pitches.

Referring generally to the apparatuses and systems disclosed herein, one or more methods of connecting optical connection having multiple pitches are provided. The method may include connecting a first optical cable having a first fiber pitch to a bridge adapter. After the first optical cable is connected a second optical cable having a second fiber pitch may be connected to the bridge adapter. After the connections are completed, an optical signal may be directed through the first optical cable, the bridge adapter, and the second optical cable. As such, an optical signal may be directed from a first optical cable having a first fiber pitch to a second optical cable having a second fiber pitch through the use of a single bridge adapter.

Various methods may further include sending an optical signal through a fiber that is embedded in an optical wave bridge component of the bridge adapter. In still other embodiments the optical signal may be reflected off at least one reflective surface or a plurality of reflective surfaces that may be disposed in the optical wave bridge. In certain embodiments the method may also include reflecting the optical signal off one or more lenses disposed in the optical wave bridge. The optical signal may thereby be focused, expanded, collimated, or otherwise provide higher mating tolerances to preserve or enhance signal strength.

Advantages of one or more example embodiments may include one or more of the following:

In one or more example embodiments, an optical bridge adapter may be used to connect two optical cables having different fiber pitches through a single adapter.

In one or more example embodiments, an optical bridge adapter may be used to connect two optical cables having different orientation, such as cables having connections that are inline, parallel, substantially parallel, non-parallel, or at various angles.

In one or more example embodiments, an optical bridge adapter may be used to connect two optical cables using optical fibers embedded in physical channels within an optical wave bridge.

In one or more example embodiments, an optical bridge adapter may be used to connect two optical cables by molding total internal reflection optical paths therethrough.

In one or more example embodiments, an optical bridge adapter may be used to connect two optical cables without introducing additional ferrule-terminated fibers therebetween.

In one or more example embodiments, an optical bridge adapter may be used to connect two optical cables have different pitches thereby preventing the use of optical breakout boxes that may add cost and optical power loss.

While the claimed subject matter has been described with respect to the above-noted embodiments, those skilled in the art, having the benefit of this disclosure, will recognize that other embodiments may be devised that are within the scope of claims below as illustrated by the example embodiments disclosed herein. Accordingly, the scope of the protection sought should be limited only by the appended claims.

What is claimed is:

1. A bridge adapter comprising:
   an adapter housing having a first end and a second end; and
   an optical wave bridge disposed in the adapter housing between the first end and second end, the optical wave bridge comprising:
      a first ferrule connection configured to receive a first optical connector on the first end comprising a first pitch,
      a second ferrule connection configured to receive a second optical connector on the second end comprising a second pitch, and
      an optical path between the first ferrule connection and the second ferrule connection.

2. The bridge adapter of claim 1, wherein the optical path further comprises at least one reflective surface configured to direct an optical signal from the first ferrule connection to the second ferrule connection.

3. The bridge adapter of claim 1, wherein the optical path further comprises a plurality of reflective surfaces configured to direct an optical signal from the first ferrule connection to the second ferrule connection.

4. The bridge adapter of claim 1, wherein the optical path further comprises at least one of a collimating lens and a focusing lens.

5. The bridge adapter of claim 1, wherein the optical path further comprises at least one reflective surface and at least one of a collimating lens and a focusing lens.

6. The bridge adapter of claim 1, wherein the optical path further comprises at least one pair of embedded fibers connecting the first ferrule connection to the second ferrule connection.

7. The bridge adapter of claim 1, wherein the first end of the adapter housing comprises a first connector alignment feature and the second end of the adapter housing comprises a second connector alignment feature.

8. A method of connecting optical cables having multiple pitches, the method comprising:
   connecting a first optical cable having a first ferrule pitch to a bridge adapter;
   connecting a second optical cable having a second ferrule pitch to the bridge adapter; and
   directing an optical signal through the first optical cable, the bridge adapter, and the second optical cable, wherein the directing comprises sending the optical signal through an optical wave bridge disposed in the bridge adapter, and having the first ferrule pitch on a first end and the second ferrule pitch on a second end, and wherein the optical wave bridge comprises:
      a first ferrule connection configured to receive the first optical cable on the first end;
      a second ferrule connection configured to receive the second optical cable on the second end; and
      an optical path between the first ferrule connection and the second ferrule connection.

9. The method of claim 8, wherein the directing further comprises sending the optical signal though a fiber embedded in the optical wave bridge.

10. The method of claim 8, wherein the directing further comprises reflecting the optical signal off at least one reflective surface disposed in the optical wave bridge.

11. The method of claim 8, wherein the directing further comprises reflecting the optical signal off a plurality of reflective surfaces disposed in the optical wave bridge.

12. The method of claim 8, wherein the directing further comprises at least one of collimating and focusing the optical signal with a lens disposed in the optical wave bridge.

13. The method of claim 8, further comprising aligning the first ferrule pitch of the first optical cable to the first ferrule pitch of the bridge adapter and aligning the second ferrule pitch of the second optical cable to the second ferrule pitch of the bridge adapter.

14. A bridge adapter comprising:
a first end and a second end;
a first ferrule connection disposed on the first end, and configured to receive a first optical connector, wherein the first ferrule connection has a first pitch;
a second ferrule connection disposed on the second end and configured to receive a second optical connector, wherein the second ferrule connection has a second pitch; and
an optical path optically connecting the first ferrule connection and the second ferrule connection.

15. The bridge adapter of claim 14, wherein the optical path comprises at least one reflective surface.

16. The bridge adapter of claim 14, wherein the optical path comprises a plurality of reflective surfaces.

17. The bridge adapter of claim 14, wherein the optical path comprises at least one of a collimating lens and a focusing lens.

18. The bridge adapter of claim 14, wherein the optical path further comprises at least one pair of embedded fibers connecting the first ferrule connection to the second ferrule connection.

19. The bridge adapter of claim 14, wherein the optical path comprises shaped internal conduits to provide an optical connection between the first ferrule connection and the second ferrule connection and wherein the shaped internal conduits have the first pitch at the first end and the second pitch at the second end.

\* \* \* \* \*